April 8, 1941.                J. W. SMITH                2,237,616
                              BEARING SEAL
                           Filed April 9, 1938
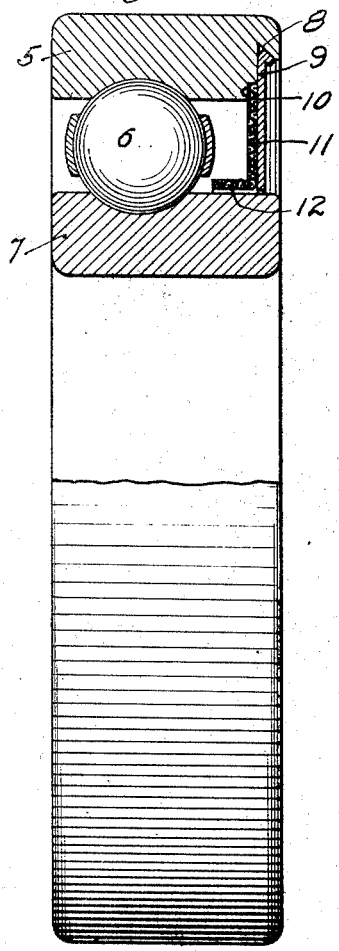
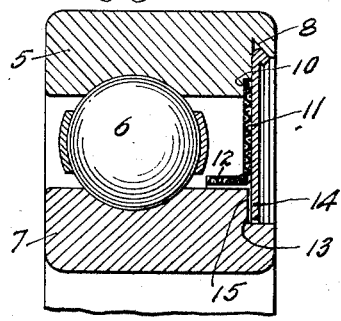
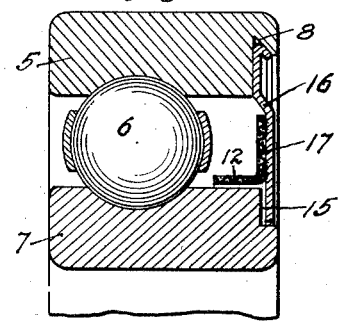
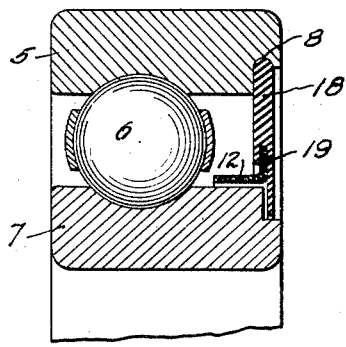
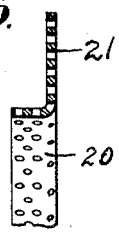
INVENTOR
JOHN W. SMITH
BY
ATTORNEYS.

Patented Apr. 8, 1941

2,237,616

UNITED STATES PATENT OFFICE 2,237,616

BEARING SEAL

John W. Smith, New Britain, Conn., assignor to The Fafnir Bearing Company, New Britain, Conn., a corporation of Connecticut Application April 9, 1938, Serial No. 201,028

13 Claims. (Cl. 308—187.2)

My invention relates to an anti-friction bearing and more particularly to seal means for such a bearing.

Heretofore various types of bearing seals have been employed. Such seals have usually been of two general types, first, plate seals which comprise a metal plate secured to one bearing ring and extended into sealing proximity to the other bearing ring, usually the inner bearing ring, and second, felt seals wherein a felt ring is carried by one bearing ring, usually the outer, and extends into rubbing contact with the other bearing ring. The seals heretofore used have always had a tendency to leak some lubricant, particularly when the bearing has first been filled with a semi-liquid lubricant, such as grease, and the bearing first put in operation.

It is an object of my invention to provide an improved form of bearing seal, wherein the tendency to leak lubricant is reduced to a minimum and, in general, the object is to provide an improved and simple and cheap form of bearing seal.

In the drawing which shows, for illustrative purposes only, preferred forms of the invention—

Fig. 1 is an edge view in quarter section of a ball bearing illustrating one form of seal embodying the invention;

Fig. 2 is a fragmentary view similar to Fig. 1, illustrating a slightly modified form of seal;

Figs. 3 and 4 are views similar to Fig. 2, illustrating further modifications; and Fig. 5 is a fragmentary detail view of a different form of seal member.

In said drawing 5 indicates an outer bearing ring having a race for receiving anti-friction bearing members, such as balls 6. The inner ring 7 has a race to fit the balls 6 and, in the form shown, the two bearing rings are held in unit handling relationship by means of the balls themselves.

In the form shown in Fig. 1 one of the rings, in that case the outer, is provided at one edge with a counterbore having an undercut circumferentially extending groove 8. A sheet metal seal plate 9 is crimped into the groove 8 and extends into close proximity to the inner ring 7, as shown. Such seals are now commonly used. In addition to the seal plate 9 I employ improved seal means having many of the advantages of other types of seals, with fewer of the disadvantages. The improved seal means includes a seal member of foraminous material, such as foraminated metal, which may be in the form of metal gauze or mesh wire. As illustrated, the ring 5 is provided with a second counterbore 10 and a foraminous metal disk or plate 11 is seated in the counterbore 10 between the bottom thereof and the seal plate 9. At the inner edge of the foraminous seal disk 11 is an inturned, circumferentially extending flange 12 forming a cylinder, which extends into sealing proximity to and is preferably slightly spaced from the adjacent circumferential surface of the inner ring 7.

In the form shown in Fig. 2 the parts may be the same as those of Fig. 1 but, as illustrated in Fig. 2, the inner ring is turned down or rabbeted, as indicated at 13, and the seal plate 14 extends into the rabbet. It will be noted that by rabbeting the edge of the inner ring there is left an outwardly extending surface 15 just within the seal plate 14, which surface has a tendency to act as a slinger for throwing lubricant back into the bearing.

In both Figs. 1 and 2 the foraminous seal member 11 is held in place by being secured between the bottom of the counterbore in the outer ring and the outer metallic seal plate, which extends along the outer edge of the disk 11.

In the form shown in Fig. 3 the inner ring is rabbeted, as heretofore described, and the seal plate 16 is of slightly different form, though held to the outer ring just as has been heretofore described. The foraminous seal flange or cylinder 12, however, is positioned preferably by having a part integral therewith, such as the disk-like lip 17, integrally secured to the seal plate 16, as by welding the same thereto.

In the form shown in Fig. 4 the inner ring is rabbeted and the outer ring is provided with a counterbore and undercut groove for receiving a seal plate 18, preferably in the form of a rubber or other non-metallic disk, which may be forced or snapped into place. A part of the disk 18 extends down into the rabbeted portion and the foraminous cylindrical seal portion 12 is secured to the seal plate 18, as by having a radially outwardly extending flange 19 held in and embedded in the material of the seal plate 18.

Fig. 5 illustrates a slightly different form of foraminous member in the form of a cylindrical sheet metal member 20, having a disk-like radially outwardly extending flange or extension 21 thereon. The sheet metal of the parts 20 and 21 is perforated, though in the broader aspects of my invention only the cylindrical portion 20 need be perforated. Clearly, various other forms and combinations can be made.

With a well known felt seal ring rubbing on the inner ring some of the lubricant is absorbed by the felt; but, when the felt is saturated, or even before, there is a tendency for some lubricant to reach the outside of the bearing. With the metallic plate seal there is a substantial tendency for lubricant to work out of a grease loaded bearing and this is particularly true during the first stages of operation of the bearing. It is believed that the reason for leakage of lubricant from a bearing when it is first put in rotation is that any lubricant finding its way between the inner ring and the seal is as likely to work out of the bearing as it is to work back into it and there is some tendency for the lubricant to creep out along the inner ring and reach the outside of the bearing, for the very simple reason that there is no other place for the lubricant to go. This is particularly true when a slight pressure may be generated within the bearing due to various causes, such as air pockets expanding under the advancing temperature of the bearing.

With my improved bearing employing a foraminous seal surrounding the inner ring any lubricant creeping out along the inner ring will have a tendency to be thrown off centrifugally during rotation of the inner ring and, being so thrown off, will find its way through the foramini of the seal and again reach the interior of the bearing, instead of working out in the space between the inner ring and seal to the outside of the bearing. Other types of bearing seals with which I am familiar have not permitted this action.

While the invention has been described in considerable detail and various possible forms shown, it is to be understood that many other modifications and changes may be made within the scope of the invention as defined in the appended claims.

I claim:

1. Seal means for a bearing including a pair of concentric rings held in spaced apart relation, said seal means including a member carried by one of said rings and having a foraminous portion extending into sealing proximity to the other of said rings.

2. Seal means for a bearing including a pair of concentric rings held in spaced apart relation, said seal means including a concentric seal member having a foraminous portion extending circumferentially of one of said rings and free of and in close proximity thereto about its cylindrical surface.

3. Seal means for a bearing including a pair of concentric rings held in spaced apart relation, said seal means including a metal seal plate having a foraminous cylindrical flange-like extension lying in close proximity to a cylindrical surface of one of said bearing rings, for the purpose described.

4. Seal means for a pair of spaced apart rings disposed one within the other, said seal including a plate secured to one of said rings, and a second plate in engagement therewith and lying axially inside of said first mentioned plate, said second plate having a foraminous cylindrical extending portion circumferentially of and in close proximity to the cylindrical surface of the other of said rings, for the purpose described.

5. Seal means for a pair of concentric radially spaced apart rings, a seal plate secured to one of said rings, said ring inwardly of said seal plate having a shallow counterbore and a foraminous seal plate in said counterbore fitting between the bottom thereof and said first mentioned seal plate for holding said foraminous seal plate in place, said foraminous seal plate having a foraminous cylindrical flange extending circumferentially of and in close proximity to a cylindrical surface of the other of said rings, for the purpose described.

6. Seal means for a pair of radially spaced apart bearing rings disposed one within the other concentrically, a seal plate carried by one of said bearing rings, and a foraminous seal member bodily carried by said seal plate, said foraminous seal plate having a foraminous portion extending into close proximity to one of said bearing rings and being free of both of said bearing rings.

7. Seal means for a pair of bearing rings held in spaced apart relation, a seal plate carried by one of said bearing rings, and a foraminous seal integrally secured to said seal plate and having a foraminous part extending into sealing proximity to the other of said bearing rings, for the purpose described.

8. Seal means for a pair of concentric rings held in radially spaced apart relation, a seal plate carried by one of said rings, and a foraminous seal member bodily carried by said seal plate and having a foraminous cylindrical portion extending circumferentially about and in close proximity to a cylindrical surface on the other of said rings, for the purpose described.

9. Seal means for a pair of concentric rings held in radially spaced apart relation, including a member having a foraminous portion in sealing proximity to a part of one of said radially spaced apart rings, for the purpose described.

10. Seal means for a pair of relatively rotatable members held in radially spaced apart relation, and a seal member carried by one of said relatively rotatable members and having a foraminous flange-like extension in sealing proximity with the other of said relatively rotatable members.

11. Seal means for a pair of concentric radially spaced apart members, said seal means including a circumferentially extending metal annulus having a foraminous portion surrounding a part of the inner of said members and lying in sealing proximity thereto, for the purpose described.

12. The combination with a pair of bearing rings disposed one within the other of a plate carried by the outer of said rings and projecting toward the inner ring, and a metal plate secured to said first mentioned plate and having an axially extending foraminated flange in lubricant-sealing proximity to the outer surface of said inner ring.

13. The combination with a pair of bearing rings disposed one within the other of a plate carried by the outer of said rings and projecting toward the inner ring and having an axially extending foraminated flange in lubricant-sealing proximity to the outer surface of said inner ring.

JOHN W. SMITH.